(12) United States Patent
Kuroda (10) Patent No.: US 7,965,599 B2
(45) Date of Patent: Jun. 21, 2011

(54) INFORMATION RECORDING MEDIUM, DATA STRUCTURE, AND DATA REPRODUCING METHOD

(75) Inventor: Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 531 days.

(21) Appl. No.: 12/090,965

(22) PCT Filed: Oct. 17, 2006

(86) PCT No.: PCT/JP2006/320651
§ 371 (c)(1),
(2), (4) Date: May 23, 2008

(87) PCT Pub. No.: WO2007/046375
PCT Pub. Date: Apr. 26, 2007

(65) Prior Publication Data
US 2010/0061208 A1 Mar. 11, 2010

(30) Foreign Application Priority Data
Oct. 20, 2005 (JP) ................................. 2005-305601

(51) Int. Cl.
*G11B 7/00* (2006.01)

(52) U.S. Cl. .................................................. 369/53.21
(58) Field of Classification Search .......................... None
See application file for complete search history.

(56) References Cited

U.S. PATENT DOCUMENTS

| 6,141,483 | A | * | 10/2000 | Yamada et al. | ................. | 386/46 |
| 2003/0145181 | A1 | * | 7/2003 | Bae | ................. | 711/163 |

FOREIGN PATENT DOCUMENTS

| JP | 61-206905 | 9/1986 |
| JP | 07-262001 | 10/1995 |
| JP | 2001-023299 | 1/2001 |
| JP | 2001-231006 | 8/2001 |
| JP | 2002-358731 | 12/2002 |
| JP | 2003-060884 | 2/2003 |
| JP | 2003-162864 | 6/2003 |
| JP | 2005-038564 | 2/2005 |

* cited by examiner

*Primary Examiner* — Joseph Haley
(74) *Attorney, Agent, or Firm* — Young & Thompson (57) ABSTRACT

Content data (11), handling limit data (12), and a check program (13) are provided in a data group (10) recorded on an information recording medium (1). The check program (13) causes a reproducing device to read the content data so as to make the reproducing device function as a check device for checking the data state of the handling limit data. Thus, when the handling limit data (12) is tampered, the check program (13) is executed by the reproducing device to find the tamper.

6 Claims, 7 Drawing Sheets

INFORMATION RECORDING MEDIUM, DATA STRUCTURE, AND DATA REPRODUCING METHOD

TECHNICAL FIELD

The present invention relates to a data structure for reducing or preventing illegal reproduction, illegal copy, and other illegal handling of content data, which indicates an image, audio, a character, a numeric value, or the like, an information recording medium on which data in such a data structure is recorded, and a data reproducing method based on such a data structure.

BACKGROUND ART

Recently, various information about movies, music, books, and the like has been digitalized to data, and such digital data has been handled as commercial products. Hereinafter the digitalized data of the various information about movies, music, books, and the like is referred to as "content data".

The content data, in most cases, is recorded onto an information recording medium, such as a DVD, and is provided from a seller to a buyer through the information recording medium. Moreover, lately, the content data has been provided from the seller to the buyer through a computer network, such as the Internet, more and more.

By the way, the content data is digital data. The digital data does not deteriorate even if it is copied. That is, the quality of video or audio recorded as the digital data does not deteriorate even if it is copied. Thus, in order to protect copyright of the video, music, or the like, some invention for restricting the illegal reproduction, illegal copy, and other illegal handling of the content data is provided for the content data, an information recording medium on which the content data is recorded, or a reproducing apparatus for reproducing the content data. For example, a DVD employs a technology for restricting a reproducing apparatus capable of decoding the content data, which is recorded on the information recording medium after being encrypted, and a technology for restricting the copy of the content data.

DISCLOSURE OF INVENTION

Subject to be Solved by the Invention

However, there are those who copy the content data recorded on the information recording medium, by illegal means. Those turned out to copy the content data by the following means. That is, those decode the encrypted content data, which is recorded on the information recording medium, by illegal means, and copy the decoded content data onto another information recording medium. Moreover, in order to make the copied content data look like originally not-encrypted content data, those falsify control data, which is recorded on the information recording medium with the content data.

If such illegal copy is left unsolved, the copyright protection for movies, music, and the like is possibly not achieved.

In view of the above-exemplified problem, it is therefore a first object of the present invention to provide an information recording medium, a data structure, and a data reproducing method, which can reduce or prevent the illegal copy of the content data.

It is a second object of the present invention to provide an information recording medium, a data structure, and a data reproducing method, which can restrict the reproduction of the illegally copied content data.

Means for Solving the Object

The above object of the present invention can be achieved by an information recording medium on which a data group is recorded, the data group including: content data; handling control data for indicating restriction on handling of the control data; and a check program for making a reproducing apparatus function as a check apparatus, which checks a state of the handling control data, by reading the check program into the reproducing apparatus for reproducing the content data.

The above object of the present invention can be also achieved by data provided with: content data; handling control data for indicating restriction on handling of the control data; and a check program for making a reproducing apparatus function as a check apparatus, which checks a state of the handling control data, by reading the check program into the reproducing apparatus for reproducing the content data, the data having a structure in which one group is formed, the content data, the handling control data, and the check program being grouped on the same memory area in the one group.

The above object of the present invention can be also achieved by a data reproducing method of reproducing data by a reproducing apparatus, the data provided with: content data; handling control data for indicating restriction on handling of the control data; and a check program for making the reproducing apparatus function as a check apparatus, which checks a state of the handling control data, by reading the check program into the reproducing apparatus for reproducing the content data, the data having a structure in which one group is formed, the content data, the handling control data, and the check program being grouped on the same memory area in the one group, the data reproducing method provided with: a check program reading process of reading the check program into the reproducing apparatus; a handling control data reading process of reading the handling control data into the reproducing apparatus; and an executing process of executing the check program by using the reproducing apparatus, the executing process (a) judging whether or not the handling control data is in a predetermined state, in accordance with the check program, and (b) restricting, stopping, or forbidding the reproduction of the content data if the handling control data is not in the predetermined state on the basis of a result of the judgment.

These effects and other advantages of the present invention will become more apparent from the following embodiments.

DESCRIPTION OF REFERENCE CODES 1 information recording medium
10, 20, 31, 40, 50, 60, 70, 80 data group
12, 95 handling control data (scramble control flag)
13, 96 check program

BEST MODE FOR CARRYING OUT THE INVENTION

Hereinafter, the best mode for carrying out the present invention will be explained in each embodiment and example in order with reference to the drawings.

First Embodiment

Figures 1, 2:
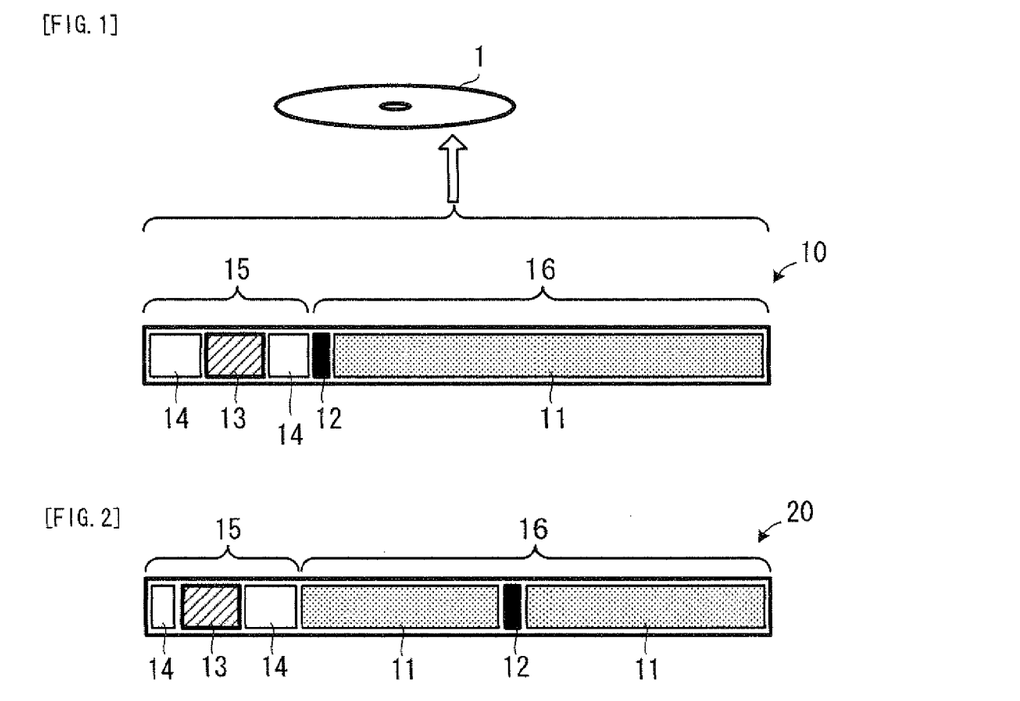
FIG. 1 is an explanatory diagram showing an information recording medium in a first embodiment of the present invention.
FIG. 2 is an explanatory diagram showing another arrangement example of handling control data and a check program of the information recording medium in the first embodiment of the present invention.

FIG. 1 shows an information recording medium in a first embodiment of the present invention. As shown in FIG. 1, an information recording medium 1 in the first embodiment of the present invention is an optical disc, for example, a DVD. Incidentally, the information recording medium of the present invention is not limited to the DVD but may be a Blu-ray disc, a HD-DVD, or the like. Moreover, the information recording medium of the present invention is not limited to the optical disc but may be a recording disk of a magneto optical disk, a magnetic disk, or the like. Moreover, the information recording medium of the present invention is not limited to the recording disk but may be a semiconductor memory, such as a memory card, or a super-high density recording medium using a dielectric constant, a capacitance, or the like.

On the information recording medium 1, a data group 10 is recorded. The data group 10 includes content data 11, handling control data 12, and a check program 13. Moreover, the data group 10 includes another control data 14 in some cases. The data is all digital data.

The data group 10 is one group in which the content data 11, the handling control data 12, the check program 13, and another control data 14 or the like are grouped on the same information recording medium (or the same memory area). The data group 10 is a group of data which constitutes one film (one title). Incidentally, the data group of the present invention may be a group of data which constitutes one chapter of one film, or a group of data which constitutes one scene of one chapter. Moreover, the data group of the present invention may be a group of data which constitutes one TV program, or a group of data which constitutes one story of a TV drama. Moreover, the data group of the present invention may be a group of data which constitutes one song, or a group of data which constitutes one movement of one song. Moreover, the data group of the present invention may be a group of data which constitutes one section of data which is segmentized more finely than the aforementioned specific examples of the data group.

The content data 11 includes image data and audio data, which constitute one film, for example. The content data 11 includes text data, numeric value data, or the like in some cases. For example, the content data 11 includes text data to display subtitles in some cases. The content data is encrypted for copyright protection or the like in some cases.

The handling control data 12 is data which indicates restriction on the handling of the content data 11. The handling control data 12 is, for example, about 1 to 4-bit data. For example, the handling control data 12 is data which indicates restriction on the reproduction of the content data 11, and specifically, it is data which indicates allowance for the reproduction of the content data 11. Even specifically, when the reproduction of the content data 11 is allowed, the handling control data 12 has a value of "0". When the reproduction of the content data 11 is not unconditionally allowed, the handling control data 12 has a value of "1".

Alternatively, the handling control data 12 is data which indicates the presence or absence of the copyright protection for the content data 11, and it is, for example, data which indicates whether or not the copyright of the content data 11 is restricted for the purpose of copyright protection. Even specifically, when the copy of the content data 11 is not restricted, the handling control data 12 has a value of "0". When the copy of the content data 11 is restricted, the handling control data 12 has a value of "1".

Alternatively, the handling control data 12 is data which indicates whether or not the content data 11 is encrypted. For example, when the content data 11 is not encrypted, the handling control data 12 has a value of "0". When the content data 11 is encrypted, the handling control data 12 has a value of "1".

Alternatively, the handling control data 12 is data which indicates the national or local allowance or non-allowance for the reproduction or recording of the content data 11. For example, it is data which indicates whether or not the reproduction or recording is allowed in Japan, or data which indicates whether or not the reproduction or recording is allowed in America. For example, if the content data 11 is allowed for the reproduction in all the countries, the handling control data 12 has a value of "0000". If the content data 11 is allowed for the reproduction only in Japan, the handling control data 12 has a value of "1110". If the content data 11 is allowed for the reproduction only in America, the handling control data 12 has a value of "1101".

The check program 13 is a computer program which makes a reproducing apparatus function as a check apparatus, which checks the state of the handling control data, by reading the check program 13 into the reproducing apparatus for reproducing the content data 11. Incidentally, the reproducing apparatus is an apparatus for reproducing the content data 11 recorded on the information recording medium, such as a DVD player. The content of the check program will be described later As shown in FIG. 1, the data group 10 is divided into a control data section 15 and a content data section 16. The handling control data 12 is disposed in the head portion of the content data section 16. On the other hand, the check program 13 is disposed in the control data section 15. As described above, the handling control data 12 and the check program 13 are disposed away from each other. Moreover, the handling control data 12 and the check program 13 are disposed in the different sections.

Incidentally, the arrangement of the handling control data 12 and the check program 13 is not limited to the arrangement shown in FIG. 1. For example, it may be the arrangement shown in FIG. 2 to FIG. 4. That is, as in a data group 20 shown in FIG. 2, the handling control data 12 may be disposed in the middle portion in the content data section 16. Alternatively, as in a data group 30 shown in FIG. 3, the handling control data 12 may be disposed near the head of the data group 30, and the check program 13 may be disposed near the middle of the data group 30. Alternatively, as in a data group 40 shown in FIG. 4, if one data group 40 is divided into two files 41 and 42 or more, the check program 13 may be disposed in one file 41, and the handling control data 12 may be disposed in the other file 42.

Figure 3:
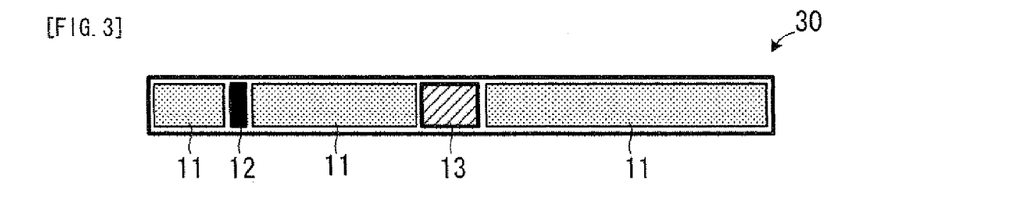
FIG. 3 is an explanatory diagram showing another arrangement example of the handling control data and the check program of the information recording medium in the first embodiment of the present invention.
Figure 4:
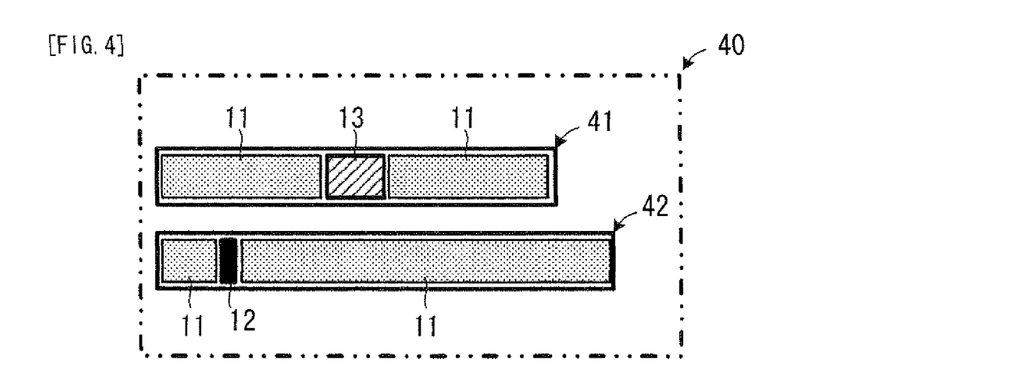
FIG. 4 is an explanatory diagram showing another arrangement example of the handling control data and the check program of the information recording medium in the first embodiment of the present invention.
Figure 5:
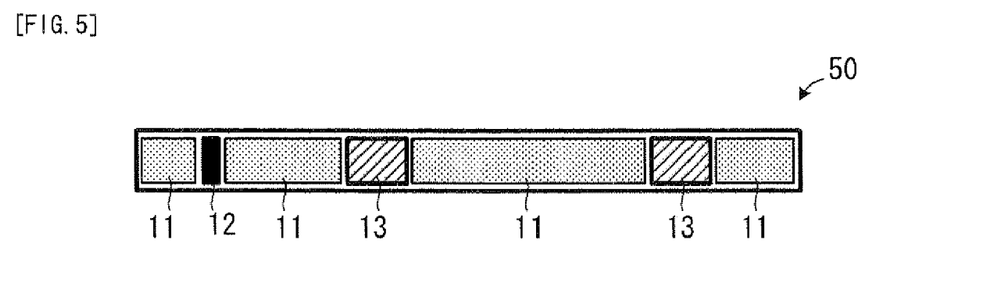
FIG. 5 is an explanatory diagram showing another arrangement example of the handling control data and the check program of the information recording medium in the first embodiment of the present invention.

As shown in FIG. 1 to FIG. 4, one cheek program 13 is disposed in the data group 10 (20, 30, 40). As shown in FIG. 5, however, two or more check programs 13 may be disposed in different positions in one data group 50. Alternatively, one check program 13 may be divided into two or more program pieces, each of which may be disposed in a different position in one data group. Moreover, as in a data group 60 shown in FIG. 6, if one data group 60 is divided into two files 61 and 62 or more, the two or more check programs may be separately disposed in the files 61 and 62. Alternatively, one check program 13 may be divided into two or more program pieces, each of which may be separately disposed in two or more files.

FIG. 7 to FIG. 10 show the content of the check program 13. Hereinafter, with reference to the drawings, an explanation will be given on a check operation of the reproducing apparatus according to the check program 13. FIG. 7 to FIG. 10 show four types of check programs, i.e. check programs 13A, 13B, 13C, and 13D. The check programs 13A to 13D are independent programs. A provider (manufacturer/producer) of the information recording medium 1 or the data group 10 employs one of the check programs 13A to 13D in accordance with the type of the handling control data 12 or the like, includes the employed check program into the data group 10, and records it onto the information recording medium together with the content data 11 and the handling control data 12.

Figure 7:
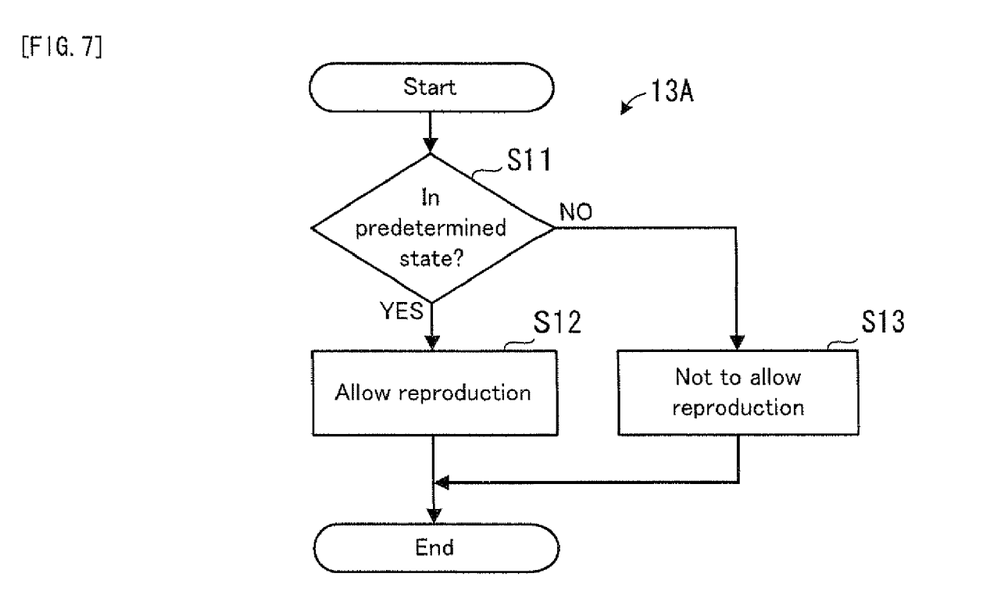
FIG. 7 is a flowchart showing the content of the check program of the information recording medium in the first embodiment of the present invention.

Firstly, an explanation will be given on the check operation of the reproducing apparatus according to the check program 13A shown in FIG. 7. As described above, the data group 10 is recorded on the information recording medium 1. Moreover, the data group 10 includes the content data 11, the handling control data 12, and the check program 13A. That is, the check program 13A is recorded on the information recording medium 1 together with the content data 11 and the handling control data 12. Moreover, if the check program 13 is the check program 13A shown in FIG. 7, the handling control data 12 is data which indicates restriction on the reproduction of the content data 11. That is, if the handling control data 12 is data which indicates restriction on the reproduction of the content data 11, the check program 13A shown in FIG. 7 is employed as the check program 13. Moreover, the content data 11 is content data whose reproduction is restricted. Thus, normally, i.e. if the value of the handling control data 12 is not illegally changed (falsified), the handling control data 12 indicates that the reproduction of the content data 11 is restricted. For example, the handling control data 12 has a value of "1". Incidentally, if the check program 13A is employed, the content data is desirably encrypted; however, it is not necessarily encrypted.

Then, a user loads the information recording medium 1 onto the reproducing apparatus, and inputs an instruction to start the reproduction to the reproducing apparatus. Then, the reproducing apparatus reads the check program 13A from the information recording medium 1. Then, the reproducing apparatus reads the handling control data 12 from the information recording medium 1. Then, the reproducing apparatus starts the execution of the check program 13A. That is, the reproducing apparatus starts the check operation in accordance with the check program 13A. By executing the check program 13A on the reproducing apparatus, the reproducing apparatus functions as the check apparatus, which checks the state of the handling control data 12.

When starting the execution of the check program 13A, as shown in FIG. 7, the reproducing apparatus firstly checks whether or not the handling control data 12 is in a predetermined state (step S11). For example, since the content data 11 is the content data whose reproduction is restricted, the handling control data 12 normally has a value of "1". In this case, the reproducing apparatus checks whether or not the handling control data 12 has a value of "1". That is, in this case, the predetermined state means that the handling control data 12 has a value of "1".

If the handling control data 12 is in the predetermined state (the step S11: YES), the reproducing apparatus gives a command to allow the reproduction of the content data 11, to a decoder or the like disposed in the reproducing apparatus (step S12). By this, the content data 11 is read by the reproducing apparatus from the data group 10 recorded on the information recording medium 1, and the content data 11 is reproduced by the decoder in the reproducing apparatus. At this time, if the content data 11 is encrypted, the encrypted content data 11 is decoded by a descriptor disposed in the reproducing apparatus or a decrypting function incorporated in the decoder ion the reproducing apparatus.

On the other hand, if the value of the handling control data 12 is changed and thus the handling control data 12 is not in the predetermined state (the step S11: NO), the reproducing apparatus gives a command not to allow the reproduction of the content data 11, to the decoder or the like disposed in the reproducing apparatus (step S13). For example, the reproducing apparatus gives a command to forbid the reproduction of the content data 11, a command to stop the reproduction of the content data 11, or a command to scramble the reproduced video of the content data 11. Alternatively, it may give a command to eject the information recording medium 1. If such a command is given, the content data 11 included in the data group 10 recorded on the information recording medium 1 will not be reproduced.

By virtue of the check operation of the reproducing apparatus according to the check program 13A, it is possible to prevent the reproduction of the illegally copied content data. The mechanism is as follows.

It is assumed that a person who plans the illegal copy of the content data is P. It is also assumed that P has obtained the information recording medium 1 on which the data group 10 is recorded. P uses a copy apparatus or the like to read the data group 10 recorded on the information recording medium 1 and record it to another information recording medium. At this time, if the content data 11 included in the data group 10 is encrypted, P decodes the content data 11 by illegal means and then records it onto the another information recording medium. Moreover, P changes the value of the handling control data 12 included in the data group 10 from "1" to "0" by illegal means and then records it onto the another information recording medium. These P's activities are based on the will to lift the restriction on the reproduction of the content data 11. On the other hand, the check program 13A is not reconfigured by P, is read from the information recording medium 1 together with the content data 11 and the handling control data 12, and then is recorded onto the another information recording medium. By these P's activities, the data group 10 including the decoded content data 11, the handling control data 12 whose value is changed to "0", and the check program 13A is recorded onto the another information recording medium. Hereinafter, the another information recording medium on which such a data group 10 is recorded is referred to as an "illegally copied recording medium". Then, it is assumed that P has sold the illegally copied recording medium to a consumer Q.

The consumer Q loads the illegally copied recording medium onto a reproducing apparatus, and inputs an instruction to start the reproduction to the reproducing apparatus. Then, the reproducing apparatus reads the check program 13A from the illegally copied recording medium. Then, the reproducing apparatus reads the handling control data 12 from the illegally copied recording medium. Then, the reproducing apparatus starts the execution of the check program 13A. When starting the execution of the check program 13A, the reproducing apparatus checks whether or not the handling control data 12 has a value of "1" (the step S11 in FIG. 7). The value of the handling control data 12 has been changed to "0" by P. The reproducing apparatus recognizes that the handling control data 12 does not have the value of "1" (the step S11: NO). Then, the reproducing apparatus gives a command not to allow the reproduction of the content data 11, to a decoder or the like in the reproducing apparatus (the step S13). By this, the content data 11 included in the data group 10 recorded on the illegally copied recording medium is not reproduced.

Figure 8:
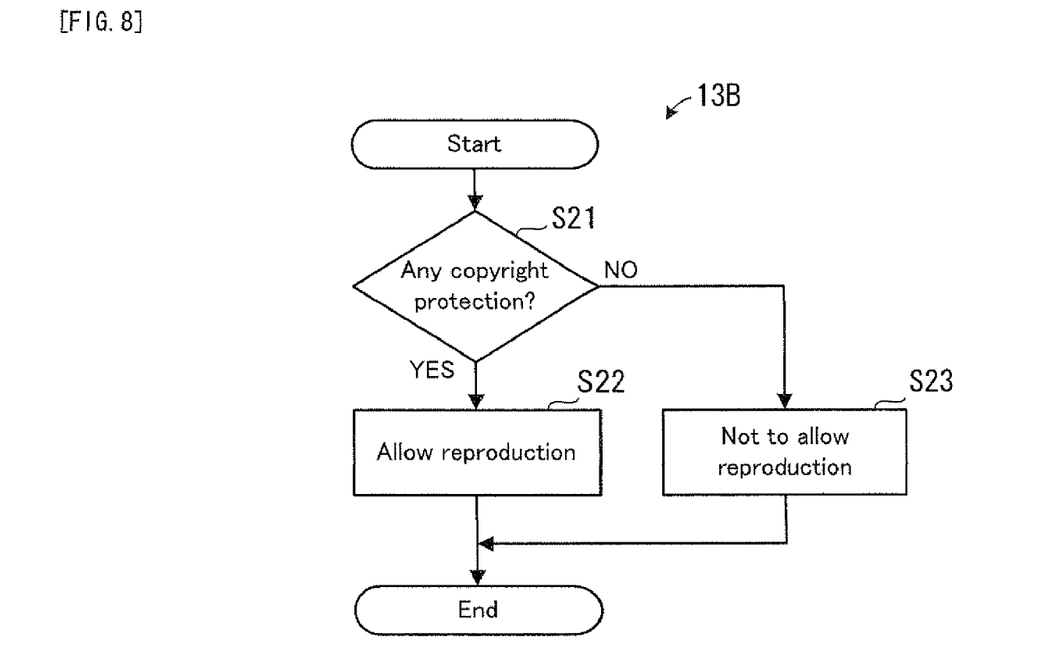
FIG. 8 is a flowchart showing the content of another check program of the information recording medium in the first embodiment of the present invention.

Next, an explanation will be given on the check operation of the reproducing apparatus according to the check program 13B shown in FIG. 8. If the check program 13 is the check program 13B shown in FIG. 8, the handling control data 12 is data which indicates the presence or absence of the copyright protection for the content data 11, for example, data which indicates whether or not the copy of the content data 11 is restricted. That is, if the handling control data 12 is data which indicates the presence or absence of the copyright protection for the content data 11, the check program 13B shown in FIG. 8 is employed as the check program 13. Moreover, the content data 11 is content data which requires the copyright protection. Thus, normally, i.e. if the value of the handling control data 12 is not illegally changed (falsified), the handling control data 12 indicates "there is the copyright protection". For example, the handling control data 12 has a value of "1".

Incidentally, if the check program 13B is employed, the content data is desirably encrypted; however, it is not necessarily encrypted.

Then, a user loads the information recording medium 1 onto the reproducing apparatus, and inputs an instruction to start the reproduction to the reproducing apparatus. Then, the reproducing apparatus reads the check program 13B from the information recording medium 1. Then, the reproducing apparatus reads the handling control data 12 from the information recording medium 1. Then, the reproducing apparatus starts the execution of the check program 13B.

When starting the execution of the check program 13B, as shown in FIG. 8, the reproducing apparatus firstly checks whether or not the handling control data 12 indicates "there is the copyright protection" (step S21). For example, since the copy of the content data 11 is restricted, the handling control data 12 normally has a value of "1". In this case, the reproducing apparatus checks whether or not the handling control data 12 has a value of "1". That is, the handling control data 12 having the value of "1" indicates "there is the copyright protection".

If the handling control data 12 indicates "there is the copyright protection" (the step S21: YES), the reproducing apparatus gives a command to allow the reproduction of the content data 11, to a decoder or the like disposed in the reproducing apparatus (step S22). By this, the content data 11 is read by the reproducing apparatus from the data group 10 recorded on the information recording medium 1, and the content data 11 is reproduced by the decoder in the reproducing apparatus. At this time, if the content data 11 is encrypted, the encrypted content data 11 is decoded by a descriptor disposed in the reproducing apparatus or a decrypting function incorporated in the decoder ion the reproducing apparatus.

On the other hand, if the value of the handling control data 12 is changed and thus the handling control data 12 does not indicate "there is the copyright protection" (the step S21: NO), the reproducing apparatus gives a command not to allow the reproduction of the content data 11 (e.g. a reproduction forbidding command, a reproduction stop command, a scramble addition command, or an eject command), to the decoder or the like disposed in the reproducing apparatus (step S23). By this, the content data 11 included in the data group 10 recorded on the information recording medium 1 is not reproduced.

By virtue of the check operation of the reproducing apparatus according to the check program 13B, it is possible to prevent the reproduction of the illegally copied content data. The mechanism is as follows.

It is assumed that the person P, who plans the illegal copy of the content data, has made the illegally copied recording medium by the aforementioned illegal means. On the illegally copied recording medium, the data group 10 including the decoded content data 11, the handling control data 12 whose value is changed to "0", and the check program 13B is recorded. Then, it is assumed that P has sold the illegally copied recording medium to a consumer Q.

The consumer Q loads the illegally copied recording medium onto a reproducing apparatus, and inputs an instruction to start the reproduction to the reproducing apparatus. Then, the reproducing apparatus reads the check program 13B from the illegally copied recording medium. Then, the reproducing apparatus reads the handling control data 12 from the illegally copied recording medium. Then, the reproducing apparatus starts the execution of the check program 13B. When starting the execution of the check program 13B, the reproducing apparatus checks whether or not the handling control data 12 has a value of "1" (the step S21 in FIG. 8). The value of the handling control data 12 has been changed to "0" by P. The reproducing apparatus recognizes that the handling control data 12 does not have the value of "1" (the step S21: NO). Then, the reproducing apparatus gives a command not to allow the reproduction of the content data 11, to a decoder or the like in the reproducing apparatus (the step S23). By this, the content data 11 included in the data group 10 recorded on the illegally copied recording medium is not reproduced.

Figure 9:
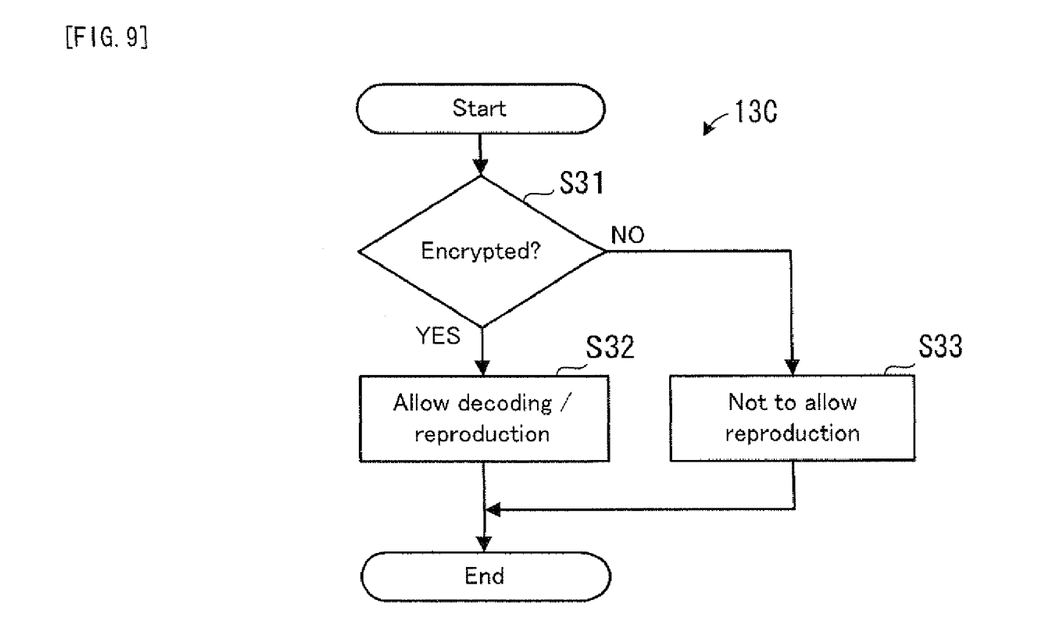
FIG. 9 is a flowchart showing the content of another check program of the information recording medium in the first embodiment of the present invention.

Next, an explanation will be given on the check operation of the reproducing apparatus according to the check program 13C shown in FIG. 9. If the check program 13 is the check program 13C shown in FIG. 9, the handling control data 12 is data which indicates whether or not the content data 11 is encrypted. That is, if the handling control data 12 is data which indicates whether or not the content data 11 is encrypted, the check program 13C shown in FIG. 9 is employed as the check program 13. Moreover, if the check program 13C is employed, the content data 11 is encrypted and recorded on the information recording medium 1, normally, i.e. if it is illegally decoded. Moreover, in this case, the handling control data 12 indicates that the content data 11 is encrypted, normally. For example, the handling control data 12 has a value of "1".

Then, a user loads the information recording medium 1 onto the reproducing apparatus, and inputs an instruction to start the reproduction to the reproducing apparatus. Then, the reproducing apparatus reads the check program 13C from the information recording medium 1. Then, the reproducing apparatus starts the execution of the check program 13C. Then, the reproducing apparatus reads the handling control data 12 from the information recording medium 1. Then, the reproducing apparatus stars the execution of the check program 13C.

When starting the execution of the check program 13C, as shown in FIG. 9, the reproducing apparatus firstly checks whether or not the handling control data 12 indicates that "the content data 11 is encrypted" (step S31). For example, the content data 11 is encrypted, and in response to this, the handling control data 12 normally has a value of "1". In this case, the reproducing apparatus checks whether or not the handling control data 12 has a value of "1". That is, the handling control data 12 having the value of "1" indicates that "the content data 11 is encrypted".

If the handling control data 12 indicates "the content data 11 is encrypted" (the step S31: YES), the reproducing apparatus gives a command to allow the decoding/reproduction of the content data 11, to a decoder or the like disposed in the reproducing apparatus (step S32). By this, the content data 11 is read by the reproducing apparatus from the data group 10 recorded on the information recording medium 1, and the content data 11 is decoded/reproduced by the decoder in the reproducing apparatus.

On the other hand, if the value of the handling control data 12 is changed and thus the handling control data 12 does not indicate "the content data 11 is encrypted" (the step S31: NO), the reproducing apparatus gives a command not to allow the reproduction of the content data 11 (e.g. a reproduction forbidding command, a reproduction stop command, a scramble addition command, or an eject command), to the decoder or the like disposed in the reproducing apparatus (step S33). By this, the content data 11 included in the data group 10 recorded on the information recording medium 1 is not reproduced.

By virtue of the check operation of the reproducing apparatus according to the check program 13C, it is possible to prevent the reproduction of the illegally copied content data. The mechanism is as follows.

It is assumed that the person P, who plans the illegal copy of the content data, has made the illegally copied recording medium by the aforementioned illegal means. On the illegally copied recording medium, the data group 10 including the decoded content data 11, the handling control data 12 whose value is changed to "0", and the check program 13C is recorded. Then, it is assumed that P has sold the illegally copied recording medium to a consumer Q.

The consumer Q loads the illegally copied recording medium onto a reproducing apparatus, and inputs an instruction to start the reproduction to the reproducing apparatus. Then, the reproducing apparatus reads the check program 13C from the illegally copied recording medium. Then, the reproducing apparatus reads the handling control data 12 from the illegally copied recording medium. Then, the reproducing apparatus starts the execution of the check program 13C. When starting the execution of the check program 13C, the reproducing apparatus checks whether or not the handling control data 12 has a value of "1" (the step S31 in FIG. 9). The value of the handling control data 12 has been changed to "0" by P. The reproducing apparatus recognizes that the handling control data 12 does not have the value of "1" (the step S31: NO). Then, the reproducing apparatus gives a command not to allow the reproduction of the content data 11, to a decoder or the like in the reproducing apparatus (the step S33). By this, the content data 11 included in the data group 10 recorded on the illegally copied recording medium is not reproduced.

Figure 10:
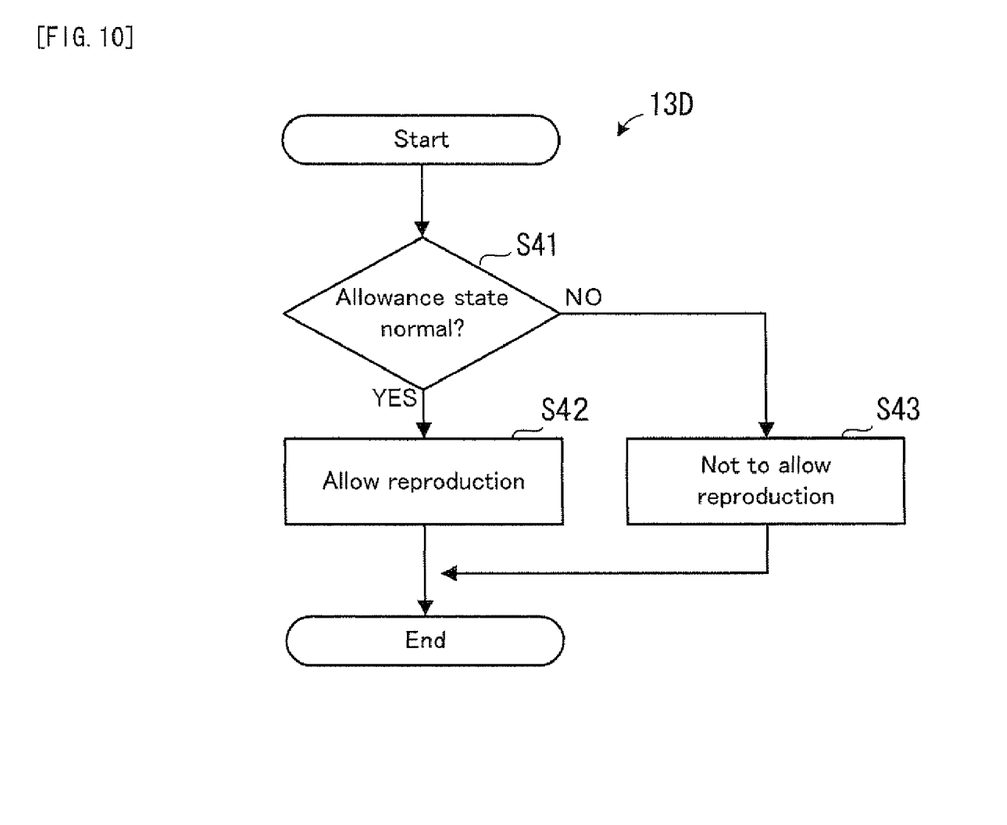
FIG. 10 is a flowchart showing the content of another check program of the information recording medium in the first embodiment of the present invention.

Next, an explanation will be given on the check operation of the reproducing apparatus according to the check program 13D shown in FIG. 10. If the check program 13 is the check program 13D shown in FIG. 10, the handling control data 12 is data which indicates the national or local allowance or non-allowance for the reproduction or recording of the content data 11. That is, if the handling control data 12 is data which indicates the national or local allowance or non-allowance for the reproduction or recording of the content data 11, the check program 13D shown in FIG. 10 is employed as the check program 13. Moreover, in the explanation below, it is assumed that the content data 11 is, for example, content data whose reproduction is allowed only in America, and thus the handling control data 12 indicates that the reproduction is allowed only in America normally For example the handling control data 12 has a value of "1101". Incidentally, if the check program 13D is employed, the content data 11 included in the data group 10 may be encrypted or maybe not.

Then, a user loads the information recording medium 1 onto the reproducing apparatus, and inputs an instruction to start the reproduction to the reproducing apparatus. Then, the reproducing apparatus reads the check program 13D from the information recording medium 1. Then, the reproducing apparatus reads the handling control data 12 from the information recording medium 1. Then, the reproducing apparatus stars the execution of the check program 13D.

When starting the execution of the check program 13D, as shown in FIG. 10, the reproducing apparatus firstly checks whether or not the handling control data 12 is normal (step S41). For example, since the copy of the content data 11 is content data whose reproduction is allowed only in America, the handling control data 12 normally has a value of "1101". In this case, the reproducing apparatus checks whether or not the handling control data 12 has a value of "1101". That is, the handling control data 12 having the value of "1101" is normal.

If the handling control data 12 is normal (the step S41: YES), the reproducing apparatus gives a command to allow the decoding/reproduction of the content data 11, to a decoder or the like disposed in the reproducing apparatus (step S42). By this, the content data 11 is read by the reproducing apparatus from the data group 10 recorded on the information recording medium 1, and the content data 11 is decoded/reproduced by the decoder in the reproducing apparatus.

On the other hand, if the value of the handling control data 12 is changed and thus the handling control data 12 is not normal (the step S41: NO), the reproducing apparatus gives a command not to allow the reproduction of the content data 11 (e.g. a reproduction forbidding command, a reproduction stop command, a scramble addition command, or an eject command), to the decoder or the like disposed in the reproducing apparatus (step S43). By this, the content data 11 included in the data group 10 recorded on the information recording medium 1 is not reproduced.

By virtue of the check operation of the reproducing apparatus according to the check program 13D, it is possible to prevent the reproduction of the illegally copied content data. The mechanism is as follows.

It is assumed that the person P, who plans the illegal copy of the content data, has made the illegally copied recording medium by the aforementioned illegal means. P uses a copy apparatus or the like to read the data group 10 recorded on the information recording medium 1 and record it to another information recording medium. At this time, if the content data 11 included in the data group 10 is encrypted, P decodes the content data 11 by illegal means and then records it onto the another information recording medium. Moreover, P changes the value of the handling control data 12 included in the data group 10 to "0000" by illegal means and then records it onto the another information recording medium. These P's activities are based on the will to lift the restriction on the national or local reproduction of the content data 11. On the other hand, the check program 13D is not reconfigured by P, is read from the information recording medium 1 together with the content data 11 and the handling control data 12, and then is recorded onto the another information recording medium. By these P's activities, the data group 10 including the decoded content data 11, the handling control data 12 whose value is changed to "0000", and the check program 13D is recorded onto the another information recording medium. Then, it is assumed that P has sold the illegally copied recording medium to a consumer Q.

The consumer Q loads the illegally copied recording medium onto a reproducing apparatus, and inputs an instruction to start the reproduction to the reproducing apparatus. Then, the reproducing apparatus reads the check program 13D from the illegally copied recording medium. Then, the reproducing apparatus reads the handling control data 12 from the illegally copied recording medium. Then, the reproducing apparatus starts the execution of the check program 13D. When starting the execution of the check program 13D, the reproducing apparatus checks whether or not the handling control data 12 has a value of "1101" (the step S41 in FIG. 10). The value of the handling control data 12 has been changed to "0000" by P. The reproducing apparatus recognizes that the handling control data 12 does not have the value of "1101" (the step S41: NO). Then, the reproducing apparatus gives a command not to allow the reproduction of the content data 11, to a decoder or the like in the reproducing apparatus (the step S43). By this, the content data 11 included in the data group 10 recorded on the illegally copied recording medium is not reproduced.

As explained above, the data group 10 on the information recording medium 1 includes the check program 13 together with the content data 11 and the handling control data 12. By this, the content data 11 recorded on the illegally copied recording medium is not reproduced by the reproducing apparatus executing the check program 13 even if those who plan to illegally copy the content data 11 decode the encrypted content data 11 and change the value of the handling control data to make the illegally copied recording medium. Therefore, the reproduction of the illegally copied content data can be prevented as long as the check program 13 is not deleted nor falsified in the illegal copy.

Moreover, the deletion of the check program 13 can be prevented by managing the arrangement position of the check program in the data group 10 not to be known in general. Moreover, the check program 13 is not about 1 to 4-bit data that is easily falsified. Therefore, even if the information about the arrangement position of the check program 13 is leaked, it is hard to falsify the check program 13.

Thus, it is possible to reduce or prevent the illegal copy, to thereby strengthen the copyright protection and expand the national or local information management.

Moreover, as shown in FIG. 1 to FIG. 3, disposing the handling control data 12 and the check program 13 away from each other in the data group 10 makes it hard for those who plan the illegal copy to find the check program 13. Moreover, as shown in FIG. 4, disposing the handling control data 12 and the check program 13 in different files makes it harder for those who plan the illegal copy to find the check program 13.

Figure 6:
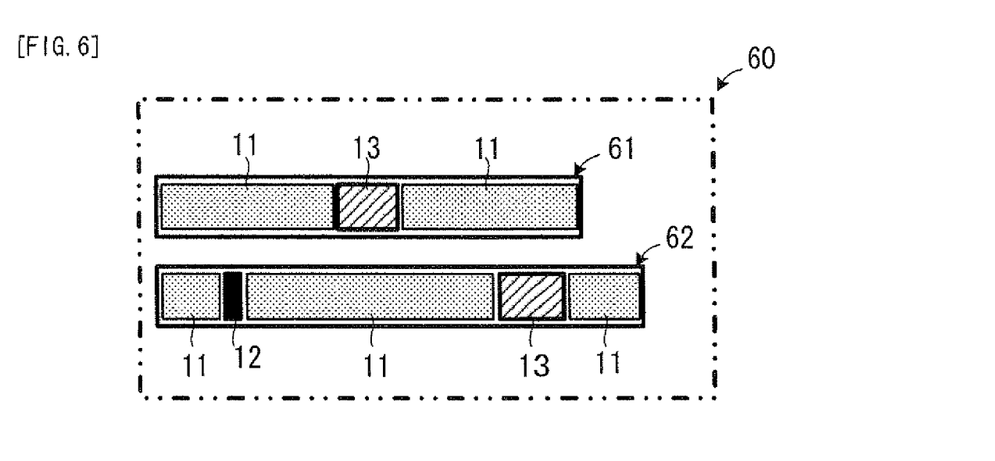
FIG. 6 is an explanatory diagram showing another arrangement example of the handling control data and the check program of the information recording medium in the first embodiment of the present invention.

Moreover, as shown in FIG. 5 or FIG. 6, providing the two or more check programs 13 in the data group 10 makes it harder for those who plan the illegal copy to find and falsify the check program 13. Moreover, dividing the check program 13 into the two or more program pieces and separately disposing the program pieces in the data group 10 make it harder for those who plan the illegal copy to find and falsify the check program 13.

Incidentally, in the aforementioned embodiment, the reproducing apparatus performs the check operation substantially as follows. That is, when a user loads the information recording medium onto the reproducing apparatus and inputs an instruction to start the reproduction to the reproducing apparatus, the reproducing apparatus reads the check program from the data group recorded on the information recording medium, reads the handling control data from the data group recorded on the information recording medium, and then starts the execution of the check program. In the check operation, the operation of reading the handling control data from the data group recorded on the information recording medium is performed in accordance with a control program stored in advance in a ROM or the like of the reproducing apparatus. The present invention, however, is not limited to this. For example, a routine for reading the handling control data from the data group recorded on the information recording medium may be provided in the check program, and the operation of reading the handling control data from the data group recorded on the information recording medium may be performed by the reproducing apparatus by using the check program.

Now, the case that the check program is carried by the information recording medium or the data group is weighed against the case that the check program is carried by the reproducing apparatus. If the check program is carried by the reproducing apparatus, it is necessary to make all the reproducing apparatus have the check program with the same content in order to provide compatibility. If the check program has the same content, those who plan the illegal copy likely analyze the content of the check program and easily make a data falsification method capable of the illegal reproduction of the data. In contrast, if the check program is carried by the information recording medium, the content of the check program can be varied for each information recording medium or data group. Moreover if the routine for reading the handling control data from the data group recorded on the information recording medium is provided in the check program, even the arrangement of the handling control data can be varied for each information recording medium or data group. That is, by embedding, in the check program, both information which indicates a fixed position of the handling control data in the data group and the routine for reading the handling control data, even the arrangement of the handling control data can be varied for each information recording medium or data group. If the content of the check program and the position of the handling control data vary for each information recording medium or data group, the data falsification is extremely hard. Consequently, it is possible to reduce or prevent the illegal copy more in the case that the check program is carried by the information recording medium or data group than the case that the check program is carried by the reproducing apparatus.

The check program can be randomly disposed in a reproduction sequence, and further a comparison value is changed by changing a reading length of the handling control data 12 by the check program, so that it is hard to find the check program.

Second Embodiment

Figure 11:
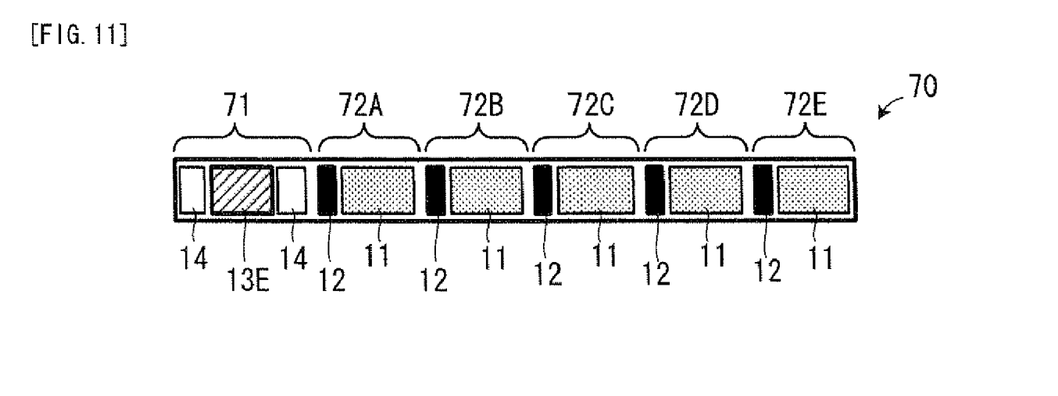
FIG. 11 is an explanatory diagram showing a data group of an information recording medium in a second embodiment of the present invention.

FIG. 11 shows a data group recorded on an information recording medium in a second embodiment of the present invention. The information recording medium in the second embodiment of the present invention is the same information recording medium as the aforementioned information recording medium 1. Moreover, various specific aspects of the data group in the second embodiment of the present invention, and the types of the data included in the data group are also the same as those of the aforementioned data group 10. That is, a data group 70 in FIG. 11 is, for example, one film, and the data group 70 includes the content data 11, the handling control data 12, a check program 13E, and another control data 14.

The data group 70, however, has a different inner structure from that of the data group 10. That is, the data group 70 is divided into a control data section 71 and a plurality of content data sections 72A, 72B, ..., 72E. Then, the check program 13E is disposed in the control data section 71, and the handling control data 12 is disposed in each of the content data sections 72A to 72E. That is, a plurality of handling control data 12 are provided in the data group 70.

Moreover, the content data 11 included in the content data sections 72A to 72E normally includes encrypted data and not-encrypted data. Then, whether or not the content data 11 is encrypted is determined in advance for each of the content data sections. Moreover, the handling control data 12 disposed in the content data section including the encrypted content data 11 normally indicates that the content data 11 is encrypted. For example, in this case, the handling control data has a value of "1". On the other hand, the handling control data 12 disposed in the content data section including the not-encrypted content data 11 normally indicates that the content data 11 is not encrypted. For example, in this case, the handling control data has a value of "0".

For convenience of explanation, a specific example will be given. It is assumed that normally, the content data 11 included in the content data sections 72A, 72B, and 72D is encrypted, and the content data 11 included in the content data sections 72C and 72E is not encrypted. In order to match this state, it is assumed that normally, the handling control data 12 disposed in the content data sections 72A, 72B, and 72D have a value of "1" and that the handling control data 1 disposed in the content data sections 72C and 72E have a value of "0".

Figure 12:
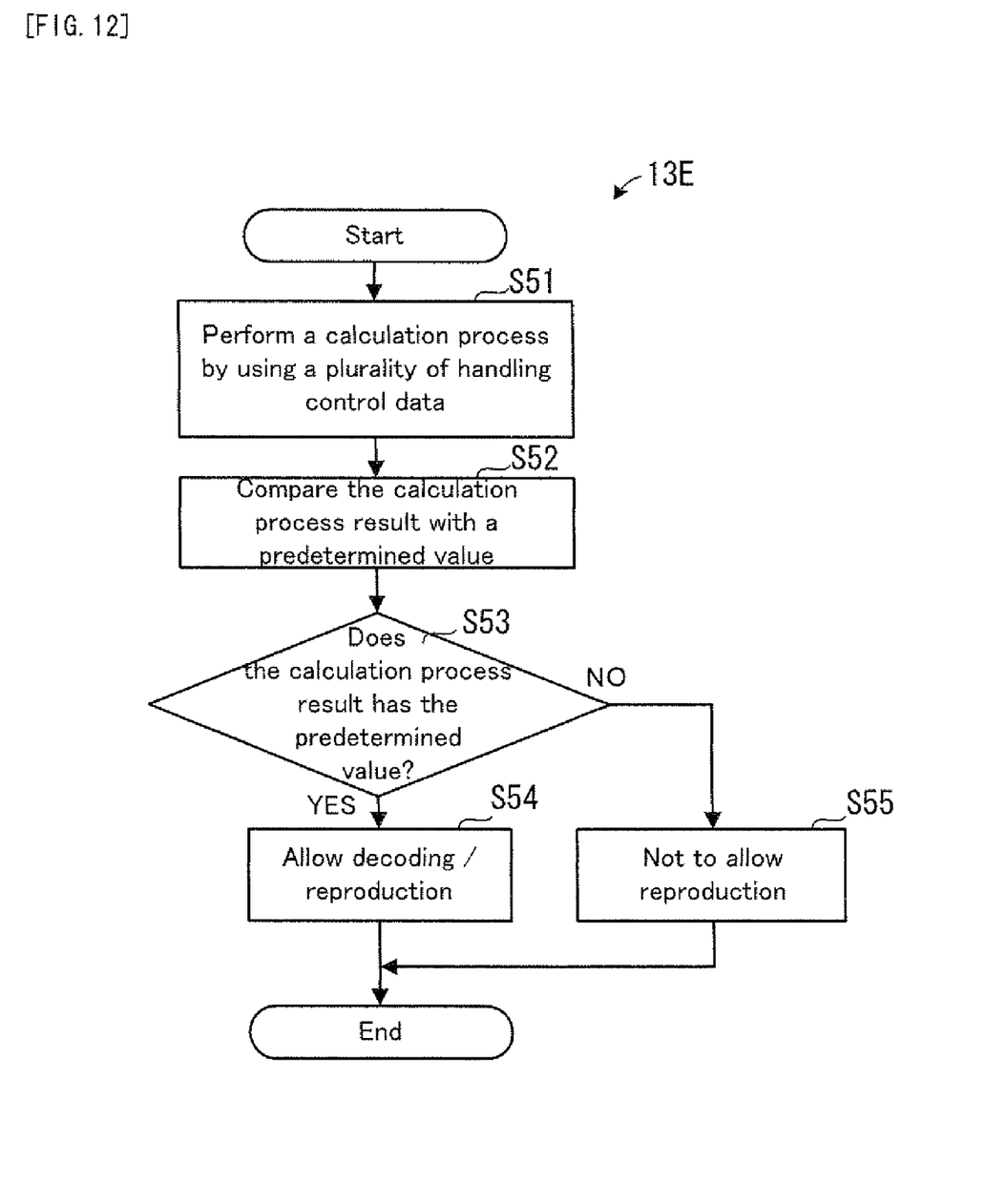
FIG. 12 is an explanatory diagram showing the content data of a check program of the information recording medium in the second embodiment of the present invention.

FIG. 12 shows the content of the check program 13E. Hereinafter, with reference to FIG. 12, an explanation will be given on the check operation of the reproducing apparatus according to the check program 13E.

A user loads the information recording medium onto the reproducing apparatus, and inputs an instruction to start the reproduction to the reproducing apparatus. Then, the reproducing apparatus reads the check program 13E from the data group 70 recorded on the information recording medium. Then, the reproducing apparatus reads the handling control data 12 disposed in each of the content data sections 72A to 72E included in the data group 70 recorded on the information recording medium 1. That is, the reproducing apparatus sequentially reads the plurality of handling control data 12 included in the data group 70. Then, the reproducing apparatus starts the execution of the check program 13E.

When starting the execution of the check program 13E, as shown in FIG. 12, the reproducing apparatus firstly performs a calculation or operation process by using the values of the plurality of handling control data 12 which are currently being read (step S51). For example, the reproducing apparatus forms a bit row by using the plurality of handling control data 12 which are currently being read in the calculation process. Specifically, the reproducing apparatus arranges the currently read handling control data 12 in the order of being read, to thereby form the bit row. As described above, normally, the handling control data 12 disposed in the content data sections 72A, 72B, and 72D have a value of "1", and the handling control data 12 disposed in the content data sections 72C and 72E have a value of "0". The reproducing apparatus reads the values of the handling control data 12 disposed in the content data sections 72A, 72B, 72C, 72D, and 72E in this order, and sequentially sets the values of the handling control data 12 in accordance with the read order from the superior to the inferior of a register. By this, normally, a bit row of "11010" is formed.

Then, the reproducing apparatus compares a result of the calculation process with a predetermined value (step S52). For example, the reproducing apparatus compares the bit row formed in the calculation process in the step S51 with a reference bit row of "11010". This predetermined value (reference bit row) is included in the data group 70 as one portion of the check program 13, and is recorded on the information recording medium as one portion of the check program 13.

Then, the reproducing apparatus judges whether or not the calculation process result is equal to the predetermined value, on the basis of the comparison result (step S53). For example, the reproducing apparatus judges whether or not the bit row formed in the calculation process in the step S51 is "11010".

If the calculation process result is equal to the predetermined value (the step S53: YES), the reproducing apparatus gives a command to allow the decoding/reproduction of the content data 11 included in the data group 70, to a decoder or the like disposed in the reproducing apparatus (step S54). By this, the content data 11 is read by the reproducing apparatus from the information recording medium, and the content data 11 is decoded/reproduced by the decoder or the like disposed in the reproducing apparatus.

On the other hand, if the value of the handling control data 12 is changed and thus the calculation process result is not equal to the predetermined value (the step S53: NO), the reproducing apparatus gives a command not to allow the reproduction of the content data 11 (e.g. a reproduction forbidding command, a reproduction stop command, a scramble addition command, or an eject command), to the decoder or the like disposed in the reproducing apparatus (step S55). For example, the reproducing apparatus gives a command to not to allow the reproduction of the content data 11 when the bit row formed in the calculation process in the step S51 is not "11010". By this, the content data 11 included in the data group 70 recorded on the information recording medium is not reproduced.

By virtue of the check operation of the reproducing apparatus according to the check program 13E, it is possible to prevent the reproduction of the illegally copied content data. The mechanism is as follows.

It is assumed that the person P, who plans the illegal copy of the content data, has made the illegally copied recording medium by the aforementioned illegal means. For example, it is assumed that the data group 70 is recorded on the illegally copied recording medium, that the control data section 71 of the data group 70 includes the check program 13E shown in FIG. 12, and that the content data section 72A of the data group 70 includes the content data 11 decoded by the illegal means and the handling control data 12 whose value is changed to "0". Then, it is assumed that P has sold the illegally copied recording medium to a consumer Q.

The consumer Q loads the illegally copied recording medium onto a reproducing apparatus, and inputs an instruction to start the reproduction to the reproducing apparatus. Then, the reproducing apparatus reads the check program 13E from the illegally copied recording medium. Then, the reproducing apparatus reads the handling control data 12 from each of the content data sections 72A to 72E in the data group 70 recorded on the illegally copied recording medium. Then, the reproducing apparatus starts the execution of the check program 13E. When starting the execution of the check program 13E, the reproducing apparatus forms the bit row by using the plurality of handling control data 12 which are currently being read (the step S51 in FIG. 12). Then, the reproducing apparatus checks whether or not the bit row formed in the step S51 is equal to the reference bit row of "11010" (the step S53). The value of the handling control data 12 disposed in the content data section 72A has been changed by P to "0". As a result, the bit row formed in the step S51 is "01010". Therefore, the reproducing apparatus recognizes that the bit row formed in the step S51 is not equal to the reference bit row of "11010" (the step S53: NO). Then, the reproducing apparatus gives a command not to allow the reproduction of the content data 11, to a decoder or the like in the reproducing apparatus (the step S55). By this, the content data 11 included in the data group 70 recorded on the illegally copied recording medium is not reproduced.

As explained above, the data group 70 on the information recording medium includes the check program 13E together with the content data 11 and the handling control data 12. By this, the content data 11 recorded on the illegally copied recording medium is not reproduced by the reproducing apparatus executing the check program 13E even if those who plan to illegally copy the content data 11 decode the encrypted content data 11 and change the value of the handling control data 12 to "0" to make the illegally copied recording medium. Therefore, the reproduction of the illegally copied content data can be prevented as long as the check program 13E is not deleted nor falsified in the illegal copy.

Moreover, the deletion of the check program 13E can be prevented by managing the arrangement position of the check program 13E in the data group 70 not to be known in general.

Moreover, it is hard to falsify the check program 13. That is, in the step S51 for the check program 13E shown in FIG. 12, the plurality of handling control data 12 are used to form the bit row, and it is judged in the step S53 whether or not the bit row is equal to the reference bit row. The reference bit row is determined in advance so as to correspond to whether or not the content data 11 is encrypted that is divided and disposed in each of the content data sections 72A to 72E in the data group 70, and the reference bit row is embedded in advance in the data group 70. With regard to whether or not the content data 11 is encrypted that is divided and disposed in each of the content data sections 72A to 72E in the data group 70, a provider of the information recording medium or data group can set it such that it varies for each information recording medium or data group in the manufacturing/production of the information recording medium or data group. Then, in accordance with this, the provider can set the state of the handling control data 12 disposed in each of the content data sections 72A to 72E such that it varies for each information recording medium or data group in the manufacturing/production of the information recording medium or data group. Moreover, in accordance with this, the provider can set the reference bit row and embed it into the check program 13E such that it varies for each information recording medium or data group in the manufacturing/production of the information recording medium or data group.

As described above, the encryption state of the content data and the content of the reference bit row vary for each information recording medium or data group, and both correspond to each other. Thus, it is hard for those who plan the illegal copy to select and decode only the encrypted content data 11 from the data group 70 including both the encrypted content data 11 and the not-encrypted content data 11. Moreover, it is also hard to find the reference bit row with the different content depending on each information recording medium or data group from the check program 13E. Thus according to the second embodiment of the present invention, it is possible to further reduce or prevent the illegal copy, to thereby strengthen the copyright protection and expand the national or local information management.

Incidentally, the aforementioned explanation on the check program 13E shown in FIG. 12 exemplifies the case that the bit row is formed by using the values of the plurality of handling control data 12 in the step S51 and the step S52 and the bit row is compared with the reference bit row embedded in advance in the check program 13E. The present invention, however, is not limited to this. For example, the values of the handling control data 12 may be added in the step S51 and the step S52, and the addition result may be compared with a reference value embedded in advance in the check program 13E. Alternatively, the values of the handling control data 12 may be applied to a predetermined calculation formula in the step S51 and the step S52, and the calculation result may be compared with a reference value embedded in advance in the check program 13E.

EXAMPLE

Figure 13:
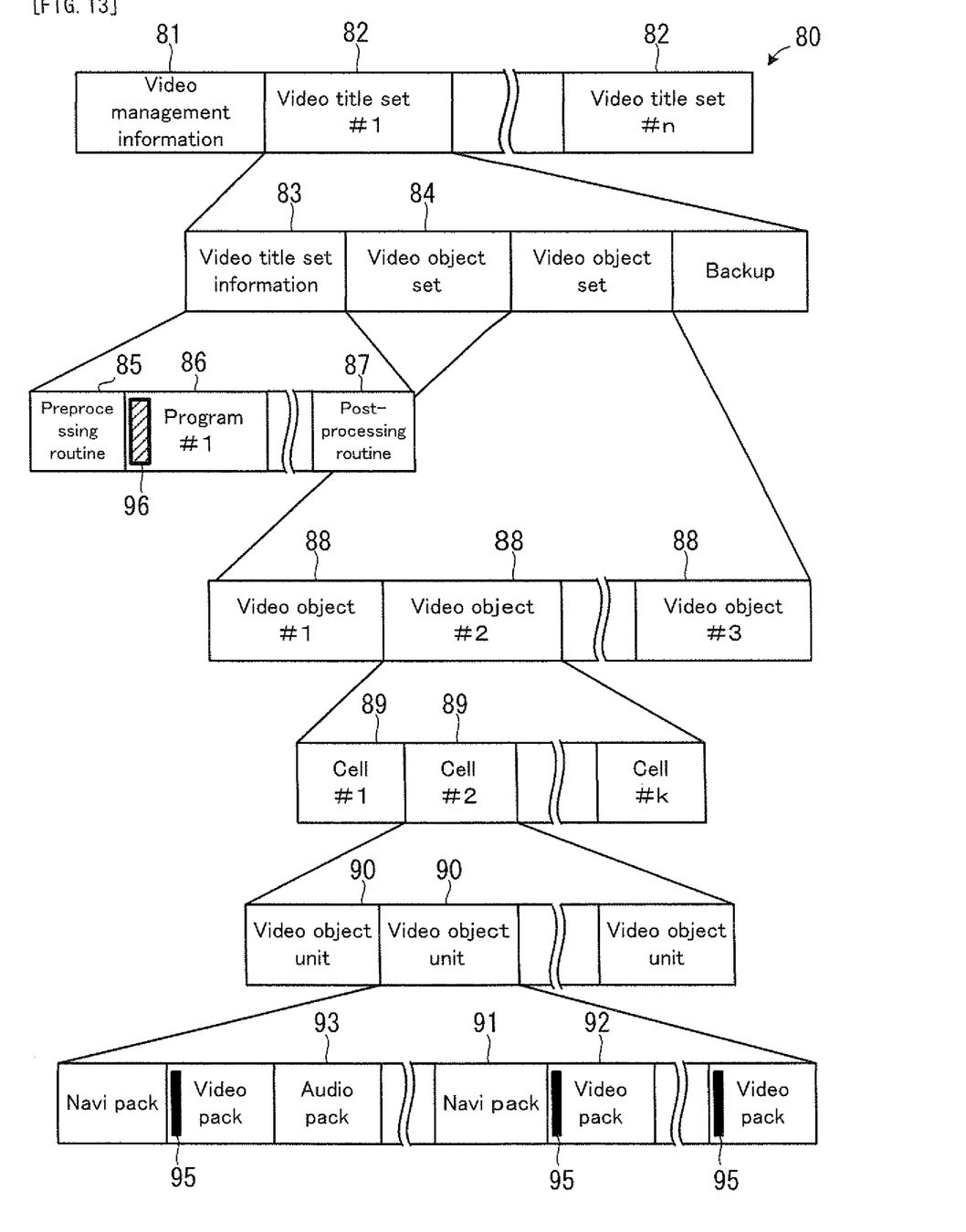
FIG. 13 is an explanatory diagram showing a data group of an information recording medium in an example of the present invention.

FIG. 13 shows the structure of a data group of an information recording medium in an example of the present invention.

The structure of a data group 80 shown in FIG. 13 is substantially the same as the data structure of a DVD video. That is, the data group 80 includes: video management information 81; and video title sets 82. The video title set 82 includes video title set information 83 and video object sets 84. The video title set information 83 includes a preprocessing routine 85, a program (PGC) 86, and a post-processing routine 87. The video object set 84 includes video objects 88. The video object 88 includes cells 89. The cell 89 includes video object units 90. The video object unit 90 includes navi packs 91, video packs 92, and audio packs 93. The video pack 92 is provided with: a header in the head portion; and video data following the header. The video data is scrambled.

The video pack 92 has a scramble control flag (PES_s-cramblinc_control) 95 in the head portion. The scramble control flag 95 corresponds to the handling control data. If there are a plurality of video packs 92, each video pack 92 has the scramble control flag 95. The video data is scrambled. Thus, the scramble control flag 95 indicates that normally the video data is scrambled. For example, the scramble control flag 95 has a value of "1".

The program 86 has a check program 96. If there are a plurality of programs 86, each program 86 desirably has the check program 96. The check program 96 can be realized, for example, by adding a new routine to a navigation routine prepared by the DVD video standard.

Figure 14:
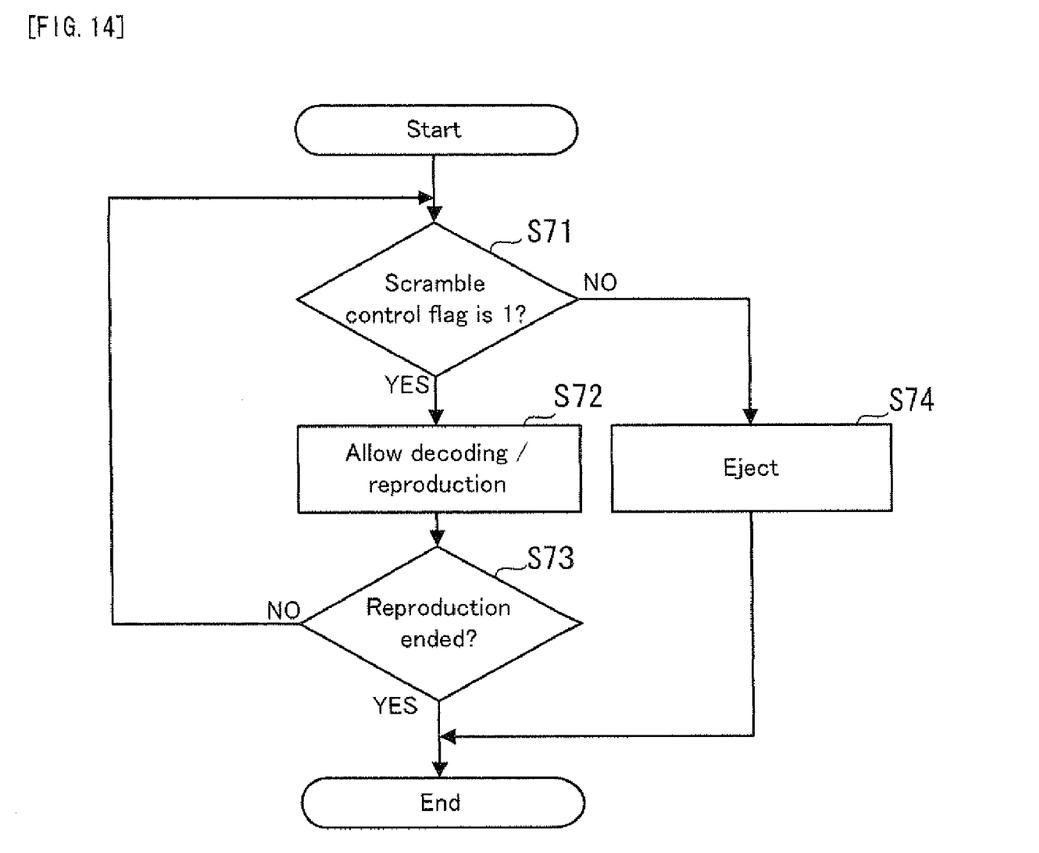
FIG. 14 is an explanatory diagram showing the content data of a check program of the information recording medium in the example of the present invention.

FIG. 14 shows the content of the check program 96. Hereinafter with reference to FIG. 14, an explanation will be given on the check operation of the reproducing apparatus according to the check program 96.

A user loads the information recording medium onto the reproducing apparatus, and inputs an instruction to start the reproduction of the program #1 (refer to FIG. 13) to the reproducing apparatus. Then, the reproducing apparatus reads the check program 96 provided in the program #1 recorded on the information recording medium. Then, the reproducing apparatus specifies the cell 89 to be reproduced first, in accordance with the program #1, and reads the scramble control flag 95 provided in the video pack 92 disposed in the beginning of the cell 89. Then, the reproducing apparatus starts the execution of the check program 96.

When starting the execution of the check program 96, as shown in FIG. 14, the reproducing apparatus firstly checks whether or not the scramble control flag 95, which is currently being read, has a value of "1" (step S71).

If the scramble control flag 95 has a value of "1" (the step S71: YES), the reproducing apparatus gives a command to allow the decoding/reproduction of the video data, to a decoder or the like disposed in the reproducing apparatus (step S72). By this, the video data of the video pack 92 disposed in the beginning of the cell 89 to be reproduced first according to the program #1 is read by the reproducing apparatus, and the video data is decoded and reproduced by the decoder or the like in the reproducing apparatus.

Then, the reproducing apparatus reads the scramble control flag 95 provided in the video pack 92 to be reproduced next, and executes the check program 96 with regard to the scramble control flag 95. As described above, the reproducing apparatus sequentially reads the scramble control flag 95 provided in the video pack 92 to be reproduced, in accordance with the reproduction order determined by the program #1, and sequentially executes the check program 96 with regard to each scramble control flag 95. As long as each scramble control flag 95 has a value of "1", the decoding/reproduction of the video data is continued. When the reproduction of the video data of the video pack 92 included in the cell 89 specified by the program #1 is ended (the step S73: YES), the check operation of the reproducing apparatus is ended.

On the other hand, if the value of the currently read scramble control flag 95 is changed and thus the scramble control flag 95 does not have a value of "1" (the step S71: NO), the reproducing apparatus ejects the information recording medium (step S74). By this, the video data and other content data recorded on the information recording medium are not reproduced.

As explained above, the data group 80 recorded on the information recording medium includes the check program 96 together with the video data and the scramble control flag. By this, the video data and other data recorded on the illegally copied recording medium are not reproduced by the reproducing apparatus executing the check program 96 even if those who plan to illegally copy the video data decode the encrypted video data and change the value of the scramble control flag 95 to "0" to make the illegally copied recording medium. Therefore, the reproduction of the illegally copied content data can be prevented as long as the check program 96 is not deleted nor falsified in the illegal copy. Thus, it is possible to reduce or prevent the illegal copy, to thereby strengthen the copyright protection.

Incidentally, the aforementioned explanation on the example exemplifies the case that the scramble control flag 95 is provided in the video pack 92 and whether or not to allow the reproduction of the video data is determined by using the check program 96. The present invention, however, is not limited to this. For example, the handling control data may be provided in the audio pack 93 to determine whether or not to allow the reproduction of audio data by using the check program.

Moreover, each of the step S11 in FIG. 7, the step S21 in FIG. 8, the step S31 in FIG. 9, the step S41 in FIG. 10, and the step S71 in FIG. 14 is a specific example of the judgment routine. Moreover, each of the step S13 in FIG. 7, the step S23 in FIG. 8, the step S33 in FIG. 9, the step S43 in FIG. 10, the steps S53 and S55 in FIG. 12, and the step S74 in FIG. 14 is a specific example of the restriction executive routine. Moreover, the step S51 in FIG. 12 is a specific example of the calculation process routine, and the step S52 is a specific example of the comparison routine.

Incidentally, in the present invention, various changes may be made, if desired, without departing from the essence or spirit of the invention which can be read from the claims and the entire specification. An information recording medium, a data structure, and a data reproducing method, all of which involve such changes, are also intended to be within the technical scope of the present invention.

INDUSTRIAL APPLICABILITY

The information recording medium, the data structure, and the data reproducing method according to the present invention can be applied to a data structure for reducing or preventing illegal reproduction, illegal copy, and other illegal handling of content data, which indicates an image, audio, a character, a numeric value, or the like, an information recording medium on which data in such a data structure is recorded, and a data reproducing method based on such a data structure.

The invention claimed is:

1. An information recording medium on which a data group is recorded,
   the data group including:
   content data;
   handling control data for indicating whether or not the content data is encrypted; and a check program for making a reproducing apparatus function as a check apparatus, which checks a state of the handling control data to thereby check whether or not the encrypted content data is illegally decoded, by reading the check program into the reproducing apparatus for reproducing the content data, wherein the data group is divided into a plurality of sections, the handling control data is provided in each of the sections, the check program comprises:

a calculation process routine for performing a predetermined calculation process by using a plurality of handling control data, each of which is provided in respective one of the sections;

a comparison routine for comparing a result of the calculation obtained by the calculation process routine with a predetermined value; and a restriction executive routine for restricting, stopping, or forbidding the reproduction of the content data if the handling control data is not the predetermined state, on the basis of a result of the comparison by the comparison routine.

2. The information recording medium according to claim 1, wherein the handling control data is data which further indicates restriction on the reproduction of the content data.

3. The information recording medium according to claim 1, wherein the handling control data is data which further indicates presence or absence of the copyright protection for the content data.

4. The information recording medium according to claim 1, wherein the handling control data is data which further indicates national or local allowance or non-allowance for reproduction or recording of the content data.

5. The information recording medium according to claim 1, wherein the check program comprising:

a judgment routine for judging whether or not the handling control data is in a predetermined state; and a restriction executive routine for restricting, stopping, or forbidding the reproduction of the content data if the handling control data is not the predetermined state, on the basis of a result of the judgment by the judgment routine.

6. A data reproducing method of reproducing data by a reproducing apparatus, the data comprising:

content data; handling control data for indicating whether or not the content data is encrypted; and a check program for making the reproducing apparatus function as a check apparatus, which checks a state of the handling control data to thereby check whether or not the encrypted content data is illegally decoded, by reading the check program into the reproducing apparatus for reproducing the content data, the data having a structure in which one group is formed, the content data, the handling control data, and the check program being grouped on the same memory area in the one group, said data reproducing method comprising:

a check program reading process of reading the check program into the reproducing apparatus;

a handling control data reading process of reading the handling control data into the reproducing apparatus; and an executing process of executing the check program by using the reproducing apparatus, the executing process (a) judging whether or not the handling control data is in a predetermined state, in accordance with the check program, and (b) restricting, stopping, or forbidding the reproduction of the content data if the handling control data is not in the predetermined state on the basis of a result of the judgment, the data group being divided into a plurality of sections, the handling control data being provided in each of the sections, the check program comprising:

a calculation process routine for performing a predetermined calculation process by using a plurality of handling control data, each of which is provided in respective one of the sections;

a comparison routine for comparing a result of the calculation obtained by the calculation process routine with a predetermined value; and a restriction executive routine for restricting, stopping, or forbidding the reproduction of the content data if the handling control data is not the predetermined state, on the basis of a result of the comparison by the comparison routine.

* * * * *